United States Patent
Goudy

[15] 3,650,234
[45] Mar. 21, 1972

[54] WATER VEHICLE

[72] Inventor: Clarence H. Goudy, 8440 Pillsbury Avenue S., Minneapolis, Minn. 55420

[22] Filed: Nov. 5, 1969

[21] Appl. No.: 874,331

[52] U.S. Cl. .........................................................114/16 A
[51] Int. Cl. ...............................................................B63g 8/00
[58] Field of Search ....................114/16, 16 A; 244/83 B, 83

[56] References Cited

UNITED STATES PATENTS 2,460,374  2/1949  Walls...................................244/83 B
2,918,889  12/1959  Rebikoff..............................114/16 A Primary Examiner—Trygve M. Blix
Attorney—Merchant & Gould

[57] ABSTRACT

An underwater vehicle is disclosed which is intended for use by scuba divers and underwater swimmers. The vehicle has a streamlined, elongated body which the rider mounts in prone position. The vehicle is propeller driven by a battery powered electric motor, and is steered by a single control member which effects right, left, upward, downward and rolling vehicular movement.

3 Claims, 7 Drawing Figures

PATENTED MAR 21 1972
3,650,234
SHEET 1 OF 2
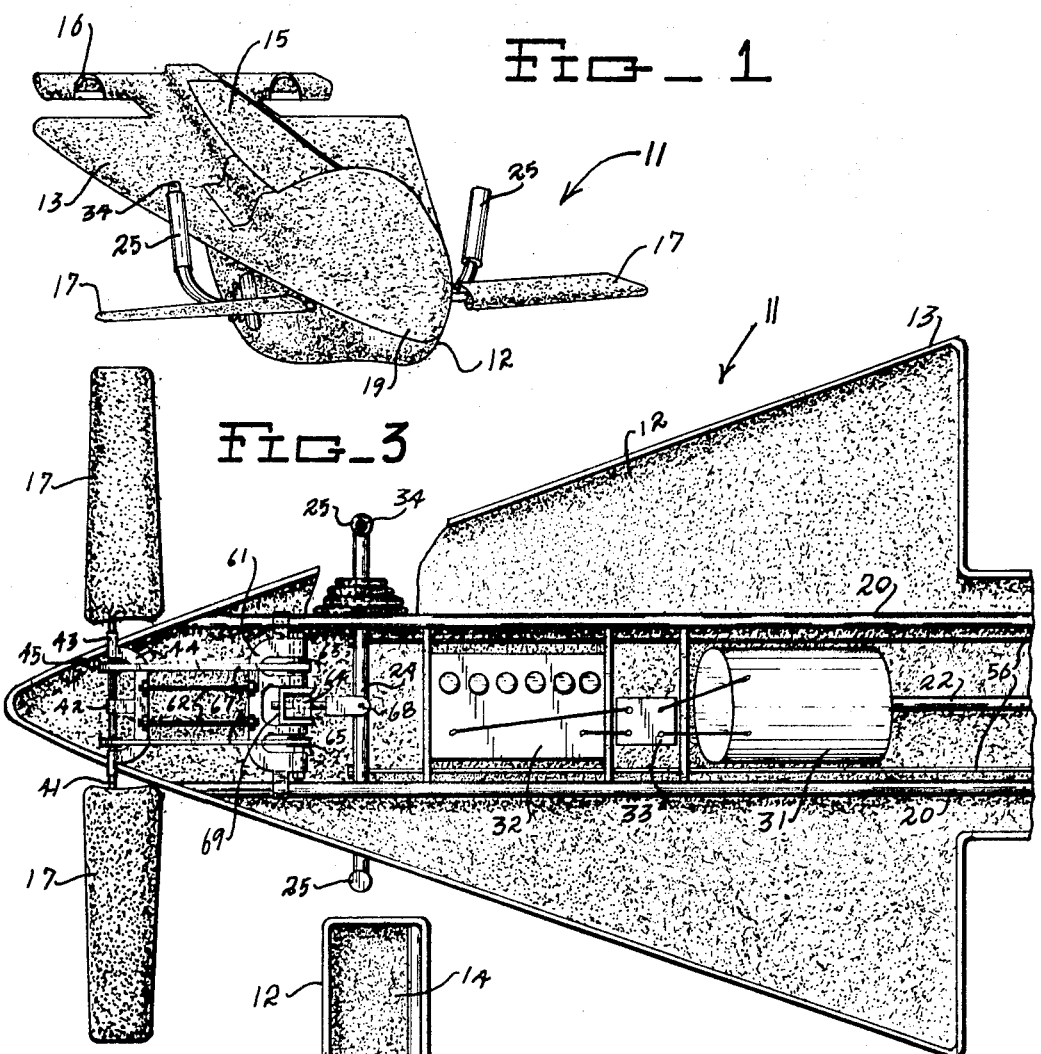
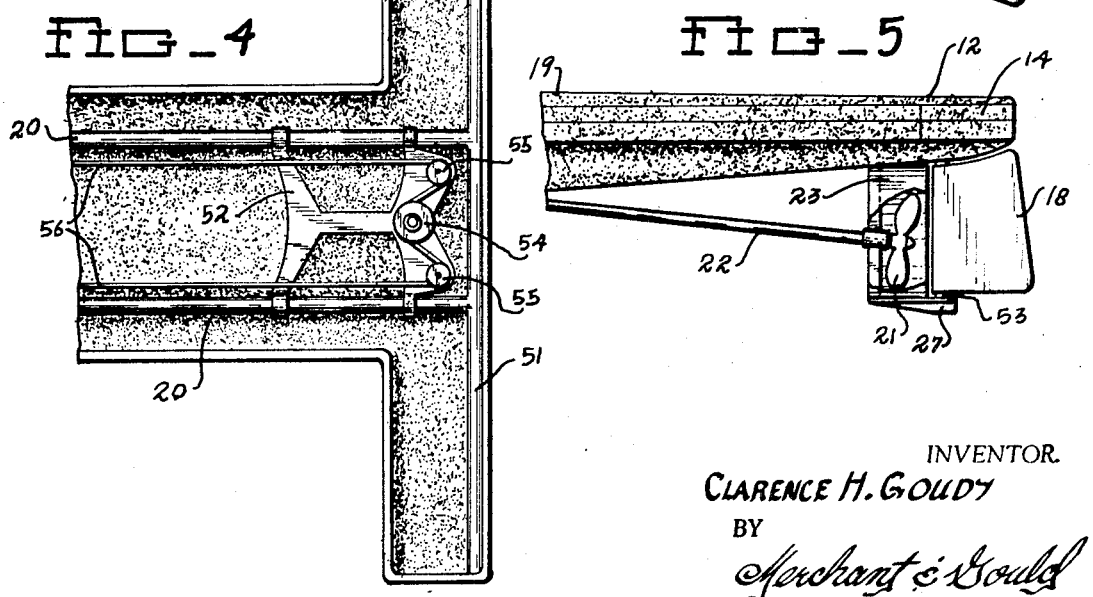
INVENTOR.
CLARENCE H. GOUDY
BY
Merchant & Gould
ATTORNEYS

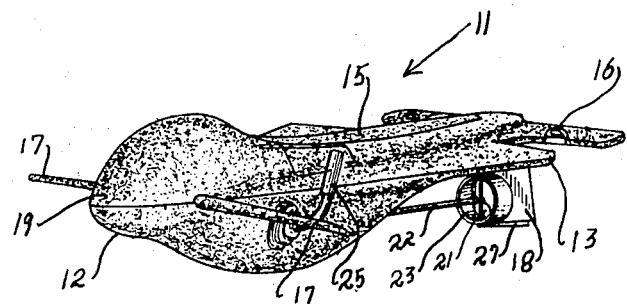
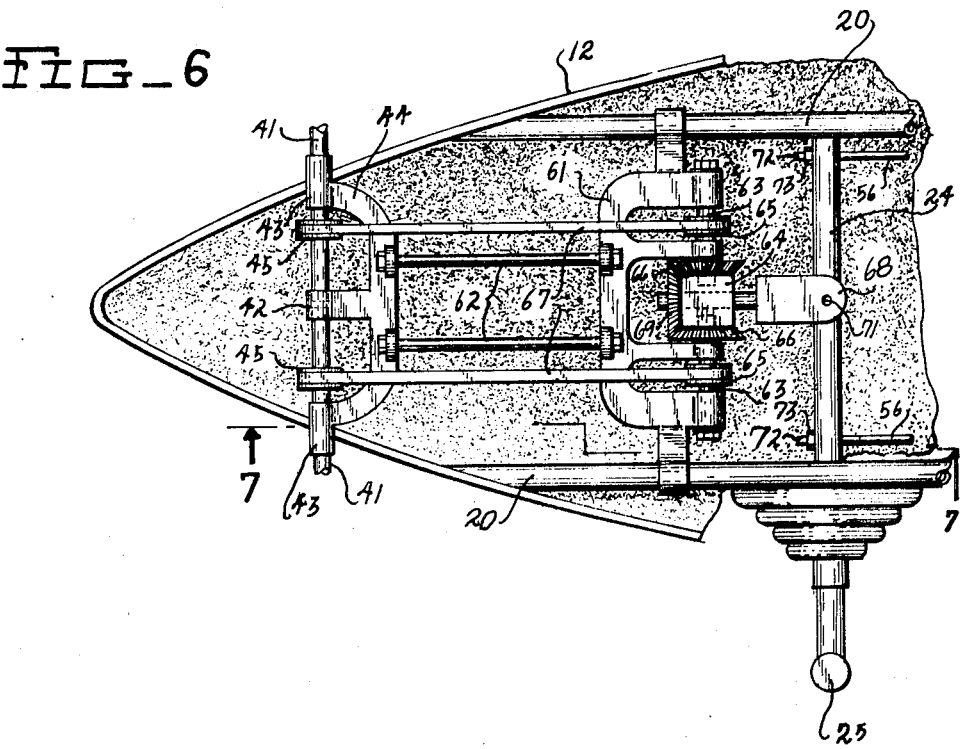
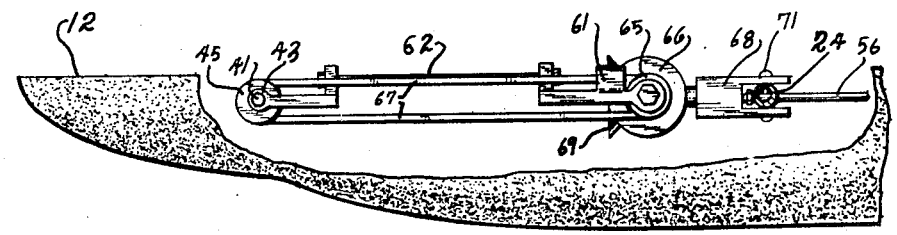
INVENTOR.
CLARENCE H. GOUDY
BY
Merchant & Gould
ATTORNEYS

WATER VEHICLE

The invention is related to underwater vehicles, specifically of the type which scuba divers and underwater swimmers mount and ride in a prone position.

Existing underwater vehicles consist of an elongated body upon which the rider lies, planing wings or elevators for effecting upward and downward movement of the vehicle and a rudder for guiding the vehicle to the right and left. Some prior art devices includes independently operating planing members that can be rotated in opposite directions to cause rolling of the vehicle about its longitudinal axis.

Various devices are used to control the position and direction taken by the water vehicle. However, since three degrees of vehicular movement are possible, complete control of the vehicle has required a plurality of control devices. My invention resides in a single steering device capable of independently effecting all three vehicular movements. The invention enables an underwater rider to have simple but complete control of his vehicle through actuation of the single device, thus enabling him to give attention to matters other than control of the vehicle.

BRIEF DESCRIPTION OF THE DRAWINGS

FIG. 1 is a front perspective view of an underwater vehicle having a single steering mechanism;

FIG. 2 is a side perspective view of the underwater vehicle;

FIG. 3 is a top view of the underwater vehicle with the cover removed, showing the control mechanism and power train;

FIG. 4 is a detailed top view of the rudder control mechanism of the underwater vehicle;

FIG. 5 is a side view of the propeller and rudder of the underwater vehicle;

FIG. 6 is an enlarged top view of the steering mechanism of the underwater vehicle; and FIG. 7 is an enlarged sectional view of the steering mechanism taken along line 7—7 of FIG. 6.

DESCRIPTION OF THE PREFERRED EMBODIMENT

Referring initially to FIG. 1 and 2, an underwater vehicle is represented generally by the numeral 11. Vehicle 11 consists of a dolphin-shaped, elongated body 12 having a delta wing 13 and a horizontal tail 14. Body 12 is preferably made of Fiberglas or a similar substance, and includes sufficient buoyant material to permit the vehicle to float while fully loaded and equipped. Body 12 has a removable top 19 formed with a flat area shown at 15 which enables a rider to lie comfortably in a riding position. Tail 14 has a pair of stirrups 16 into which the rider places his heels to maintain the riding position. The construction of stirrups 14 also enables the rider to wear swim fins while riding the vehicle.

A pair of wing members 17 are rotatably mounted on body 12 for governing upward and downward movement of the vehicle. As discussed below, wing members 17 can be rotated in opposite directions to effect rolling movement of the vehicle about its longitudinal axis. A rudder 18 is rotatably mounted on a shaft 53 between a frame 27 and body 12 to guide the vehicle to the right and left. Disposed immediately in front of rudder 18 is a propeller 21 which is mounted on a drive shaft 22 for propelling the vehicle. Drive shaft 22 is journaled in frame 27, which also supports a guard ring 23 surrounding propeller 21.

A single steering member 24 having handles 25 on either side of body 12 is provided to control all movements of wing members 17 and rudder 18. As will be seen below, steering member 24 extends through body 12 in a single piece and is freely movable in all directions. Resilient bellows 26 act as a seal between body 12 and steering member 24.

FIG. 3 shows the underwater vehicle with the top 19 of body 12 removed. Disposed inside is an electric motor 31 which is particularly suited for marine use and can be totally submerged without damage. Motor 31 is operatively connected to drive shaft 22 in order to propel the vehicle. A conventional storage battery 32 supplies the power to motor 31 through a moistureproof relay 33, which is in turn actuated by a switch 34 housed in the right handle 25 of steering member 24.

As best seen in FIG. 6, each of the wing members 17 is mounted on a shaft 41, each of which is independently journaled in bearings 42 and 43 of a support frame 44. Mounted on each of the shafts 41 is a pulley 45 which is used to rotate its respective wing member 17. As mounted, the wing members 17 are capable of coplanar rotation to effect upward and downward movement of the vehicle, or opposite rotational movement to cause rolling of the vehicle about its longitudinal axis.

As best shown in FIG. 4, a cross support member 51 is connected to a pair of support members 20 that extend the length of body 12, and serves as an inner frame support for tail 14. Also connected to support members 20 is a frame 52 which houses the control mechanism for rudder 18. A drive pulley 54 is mounted at the extreme top end of shaft 53, which is journaled in frame 52, and operates in association with a pair of idler pulleys 55 which are also carried by frame 52. A cable 56 is brought into tension around idler pulleys 55 and drive pulley 54, and as discussed below, its movement causes rotation of rudder 18 for right and left movement of the vehicle.

Referring to FIGS. 6 and 7, a sterring mechanism for the underwater vehicle is shown to be housed in a frame 61, which is in turn carried by support members 20. A pair of elongated bolts 62 connect frame 44 with frame 61 and maintain alignment therebetween. Frame 61 also carries a pair of independently rotating shafts 63, each of which is also journaled in a bearing block 64. Each rotating shaft 63 carries a pulley 65 and a bevel gear 66, with belt 67 connecting each of the pulleys 65 with the respective wing member pulleys 45.

Also journaled in bearing block 64 is a bifurcated member 68 which carries a bevel gear 69 commonly meshed with the two bevel gears 66. Steering member 24 is pivotally mounted between the bifurcations of member 68 by means of a pin 71. Connected to each of the ends of cable 56 is a threaded member 72 which extends through steering member 24 and is drawn tight by a nut 73.

In operation, movement of steering member 24 about the axis of pin 71 effects movement of rudder 18 through cable 56, idler pulleys 55 and drive pulley 54, to guide the vehicle to the right and left. Movement of steering member 24 about the axis of rotating shafts 63 causes bevel gear 69 to carry each of the bevel gears 66 with it, thus effecting coplanar movement of wings 17 by virtue of pulleys 65, pulleys 45 and belts 67, which results in upward and downward movement of the vehicle.

Rotation of steering member 24 about the axis of bifurcated member 68 causes bevel gear 69 to rotate bevel gears 66 in opposite directions, which in turn causes opposed rotation of wings 17. This movement enables the vehicle to roll clockwise or counter clockwise about its longitudinal axis, depending on the direction steering member 24 is rotated.

Thus, the single steering member 24 gives the rider complete control of the underwater vehicle through the upward, downward, right, left and rolling movements it governs, as well as starting and stopping of motor 31 by switch 26.

What I claim is:

1. An underwater vehicle comprising:
   a. an elongated body constructed for external mounting and riding in a prone position;
   b. power means for propelling the vehicle through the water;
   c. first operating means for effecting upward and downward movement of the vehicle;
   d. second operating means for effecting right and left movement of the vehicle;
   e. third operating means for effecting rolling movement of the vehicle about its longitudinal axis; and
   f. steering means for independently operating the first, second and third means, comprising:
      i. a steering member capable of rotation about first, second and third commonly perpendicular axes, the third axis being parallel to the longitudinal axis of the vehicle, the second axis lying in a plane of upward and downward movement, and the first axis lying in a plane of right and left movement; and ii. motion translating means comprising:
  1. a frame carried by the elongated body;
  2. a central bearing member;
  3. first and second independently rotating members journaled in the frame and commonly journaled in the central bearing member, the first and second rotating members disposed for rotation about the first axis;
  4. a third rotating member journaled in the central member and disposed for rotation about the third axis;
5. the steering member connected to the third rotating member for pivotal movement about the first axis;
6. first and second gears mounted on the first and second rotatable members, respectively;
7. a third gear mounted on the third rotating member and commonly meshed with the first and second gears;
8. first connecting means operatively connecting the first and second shafts with the first and third operating means;
9. and second connecting means operatively connecting the steering member with the second operating means.

2. The underwater vehicle as defined by claim 1, wherein:
a. the first and third operating means comprise first and second wing members mounted for independent rotation on the elongated body, the wing members being coplanarly rotatable for said upward and downward movement and oppositely rotatable for said rolling movement;
b. and the first connecting means comprises
  i. first and second pulleys mounted for rotation with the first and second wing members, respectively;
  ii. third and fourth pulleys mounted for rotation with the first and second rotating members, respectively;
  iii. a first belt operatively connecting the first and third pulleys;
  iv. and a second belt operatively connecting the second and fourth pulleys.

3. The underwater vehicle as defined by claim 1, wherein:
a. the third operating means comprises a rudder rotatably carried by the elongated body;
b. and the second connecting means comprises cable means operatively connecting the steering member with the rudder.

* * * * *